United States Patent [19]

Riethmüller et al.

[11] 4,379,365
[45] Apr. 12, 1983

[54] GYROCOMPASS

[75] Inventors: Heinz Riethmüller, Sandhausen; Rainer Sindlinger, Hirschberg; Peter Schultz, Dielheim b. Heidelberg, all of Fed. Rep. of Germany

[73] Assignee: TELDIX GmbH, Heidelberg, Fed. Rep. of Germany

[21] Appl. No.: 211,788

[22] Filed: Dec. 1, 1980

[30] Foreign Application Priority Data

Nov. 29, 1979 [DE] Fed. Rep. of Germany ....... 2948051

[51] Int. Cl.$^3$ ............................................. G01C 19/38
[52] U.S. Cl. ....................................... 33/316; 33/324; 33/326
[58] Field of Search ................. 33/316, 317, 318, 319, 33/324, 325, 326

[56] References Cited

U.S. PATENT DOCUMENTS

| 3,292,269 | 12/1968 | Brugger | 33/324 |
| 3,997,975 | 12/1976 | Knapp | 33/324 |
| 4,055,901 | 11/1977 | Ishii | 33/324 |
| 4,283,960 | 8/1981 | Quermann | 33/326 |

FOREIGN PATENT DOCUMENTS

1498042 6/1973 Fed. Rep. of Germany .
2336956 2/1975 Fed. Rep. of Germany .

Primary Examiner—Willis Little
Attorney, Agent, or Firm—Spencer & Kaye

[57] ABSTRACT

A gyrocompass including a first gimbal, a gyro motor mounted in the first gimbal and including a gyro rotor mounted to rotate about a horizontally alignable spin axis, a pendulous body in which the first gimbal is mounted to be rotatable about a vertically alignable axis of rotation, a housing in which the body is rotatably suspended, a verticality device associated with the body for allowing the body to assume an orientation in the housing in which the axis of rotation is vertical, and a follow-up device including a pickup mounted for sensing the angular position, about the axis of rotation, of the gimbal relative to the body and a drive connected for rotating the body relative to the housing about the axis of rotation in dependence on the position sensed by the pickup. The drive can be constituted by a stepping motor constructed to rotate in highly uniform steps and simultaneously serving to provide an indication of the angular position of the body relative to the housing about the axis of rotation. Alternatively, the drive can be constituted by a stepping motor constructed to rotate in highly uniform steps, the follow-up device can include a restraining circuit and a torquer connected between the pickup and the first gimbal for restraining the first gimbal at a defined angular position, about the axis of rotation, relative to the body, the restraining circuit providing a signal representative of the angular velocity of the first gimbal about the axis of rotation, and the gyrocompass can further include a unit for determining the direction to true north from signals representative of the angular velocity.

32 Claims, 3 Drawing Figures

GYROCOMPASS

BACKGROUND OF THE INVENTION

The present invention relates to a gyrocompass of the type including a first gimbal, a gyro motor mounted in the first gimbal and including a gyro rotor mounted to rotate about a horizontally alignable spin axis, a pendulous body in which the first gimbal is mounted to be rotatable about a vertically alignable axis of rotation, a housing in which the body is rotatably suspended, a verticality device associated with the body for allowing the body to assume an orientation, in the housing in which the axis of rotation is vertical, and a follow-up device including a pickup mounted for sensing the angular position, about the axis of rotation, of the gimbal relative to the body and a drive connected for rotating the body relative to the housing about the axis of rotation in dependence on the position sensed by the pickup.

German Auslegeschrift [Published patent application] No. 1,498,042 discloses such a gyro which is designed in principle as a rate gyro with one degree of freedom. This prior art gyro includes a gimbal which is rotatable about an axis that is oriented as vertically as possible and a gyro rotor whose spin axis is orthogonal to the above-mentioned axis of rotation, or vertical axis, and thus lies in a horizontal plane. The gimbal is arranged in a so-called pendulous body in which it is rotatable on gas bearings, or cushions, and the pendulous body is suspended in a housing by means of a cardan, or universal, joint so that vertical alignment of the gimbal axis is possible.

The thus designed verticality adjustment device also includes, at the lower end of the pendulous body, an electrically actuated verticality magnet whose armature, after effecting the vertical alignment, is supported on a calotte-shaped part of the housing. The gimbal is restrained in a zero position with respect to the housing.

Moreover, a follow-up circuit is provided which includes a pickup for sensing the angular position of the gimbal, suitable amplifying means and a setting drive between the housing and the pendulous body so as to cause the pendulous body to precess in the sense of reducing the the gimbal pickup signal.

In such a gyrocompass the horizontal component of the earth's speed of rotation is known to induce a north driving moment, which is a function of the sine of the angle of displacement of the spin axis from the north direction, so as to cause a corresponding deflection of the gimbal. The follow-up circuit causes the pendulous body to follow until the above-mentioned deflection of the gimbal goes toward zero. The angular position of the pendulous body relative to the housing, as defined by an angle sensor in the form of a resolver, then essentially corresponds to the north direction. However, in addition to the north driving moment, there also exist the restraint moment and interference moments caused particularly by gyro drift, the gimbal bearing and current leads so that, depending on the quality of the gyro, there will occur greater or lesser north-seeking errors.

There additionally exists the requirement for a short north finding time, particularly since it is desired to locate north while the gyro carrier, for example a vehicle, is in a stationary state and, for tactical reasons, longer periods of immobility are generally undesirable for a vehicle.

German Offenlegungsschrift [Laid-open application] No. 2,336,956 additionally discloses a gyrocompass of the above-mentioned type in which there is initially effected a rapid follow-up into a first position in which the gyro spin axis is roughly oriented in the north direction. Thereafter, the follow-up circuit is cut off and a torque generator, or torquer, disposed between the gimbal and the pendulous body is actuated in dependence on the gimbal pickup signal. In the restraint circuit of this design, the current of the torquer then corresponds to the restraining moment so that, under consideration of the angular moment imposed on the gyro, the input angular velocity, and thus the existing deviation from north, can be determined.

Suitable filters are provided to limit the influx of the expected external interference moments.

There also is provided an angle sensor to determine the angular position of the pendulous body with respect to the housing and the signal from this angle sensor and the north deviation signal provide the north direction indication. By including the above-mentioned restraint circuit, and with the corresponding given transfer factor, the dominant natural frequency of the gyro is increased so that the north error as a result of rectifying moments or the sensitivity to interfering movements is reduced, respectively. But since, on the one hand, the restraint moment depends on the gyro drift, which changes in an unpredictable manner, particularly with temperature or time, the emitted north angle indication may contain not insignificant errors.

SUMMARY OF THE INVENTION

It is therefore an object of the present invention to provide a gyrocompass which can be produced at low cost and which provides quick and reliable north direction determination.

The above and other objects are achieved, according to the invention, in a gyrocompass including a first gimbal, a gyro motor mounted in the first gimbal and including a gyro rotor mounted to rotate about a horizontally alignable spin axis, a pendulous body in which the first gimbal is mounted to be rotatable about a vertically alignable axis of rotation, a housing in which the body is rotatably suspended, a verticality device associated with the body for allowing the body to assume an orientation in the housing in which the axis of rotation is vertical, and a follow-up device including a pickup mounted for sensing the angular position, about the axis of rotation, of the gimbal relative to the body and a drive connected for rotating the body relative to the housing about the axis of rotation in dependence on the position sensed by the pickup, by constituting the drive by a stepping motor constructed to rotate in highly uniform steps and simultaneously serving to provide an indication of the angular position of the body relative to the housing about the axis of rotation.

Objects according to the invention can further be achieved, in a gyrocompass of the general type described above, by constituting the drive by a stepping motor constructed to rotate in highly uniform steps; including in the follow-up device a restraining circuit and a torquer connected between the pickup and the first gimbal for restraining the first gimbal at a defined angular position, about the axis of rotation, relative to the body, the restraining circuit providing a signal representative of the angular velocity of the first gimbal about the axis of rotation; and further including in the gyrocompass means for determining the direction to true north from signals representative of the angular velocity.

The gyrocompass according to the invention is distinguished by a comparatively simple and economical design, particularly since stepping motor and angle sensor are integrated and thus the complicated angle sensing systems otherwise required because of present day demands for accuracy are eliminated. It is advantageous to provide a flat rotor stepping motor which is provided with rings of teeth and has a very precise pitch. In this case the bearing for the pendulous body is simultaneously the bearing between the stator and rotor of the stepping motor, resulting in a considerable structural simplification.

In order to avoid cardan errors, the stepping motor or angle sensor, respectively, may be disposed between the cardan joint fastened to the housing and the pendulous body. Thus, if the gyro is used in a vehicle, the outer axis of the cardan joint can also be aligned very easily with the roll axis of the vehicle. However, if necessary, use can be made of a stepping motor of conventional design which is connected, in particular, with a worm gear. In all cases it is of particular advantage if the angular position of the pendulous body can be determined in a simple manner, starting from a given zero position, from the actuating signals of the stepping motor, i.e. by counting the steps of motor rotation.

The vertical alignment of the pendulous body or the vertical alignment of the gimbal axis of rotation, respectively, is preferably effected by means of an electromagnet disposed at the lower end thereof and whose armature is supported on a calotte-shaped member of the housing. Of course other verticality sensors or setting members controlled thereby may also be provided for this purpose.

According to a preferred embodiment in which a known restraining circuit is provided for the gimbal, the restraining moments or the input angular velocities, respectively, are measured at two positions which are offset with respect to one another by a given angle of, in particular, 90° and the approximate deviation from north is determined therefrom. Thereafter, the stepping motor causes the pendulous body to follow in correspondence to the north deviation and to thus roughly position itself to align the gyro rotor shaft axis in the north direction. Then the north direction is determined by a fine measurement.

In this very advantageous manner, a first approximation of the north direction of the order of magnitude of 1 degree is already available after a very short time with an accuracy which is augmented by one order of magnitude as a result of the fine measurement which takes somewhat longer. In this connection it is advisable, in order to suppress interferences, to perform several angle measurements at a time and to form averages or to filter out interfering values, respectively. The control of the above-described north seeking mode, determination of the angles as well as the filtering are preferably effected by means of a computer or microprocessor.

To compensate for gyro drift, a preferred embodiment provides that after the one fine measurement, the gyro is rotated by means of the stepping motor about a defined angle of, in particular, 180° and then a second fine measurement is performed. The thus measured restraining moments or input angle velocities, respectively, then serve to determine the north direction with very high accuracy as well as the gyro drift. Further advantages will become evident from the dependent claims and the illustrated embodiment.

DESCRIPTION OF THE PREFERRED EMBODIMENTS

Figure 1:
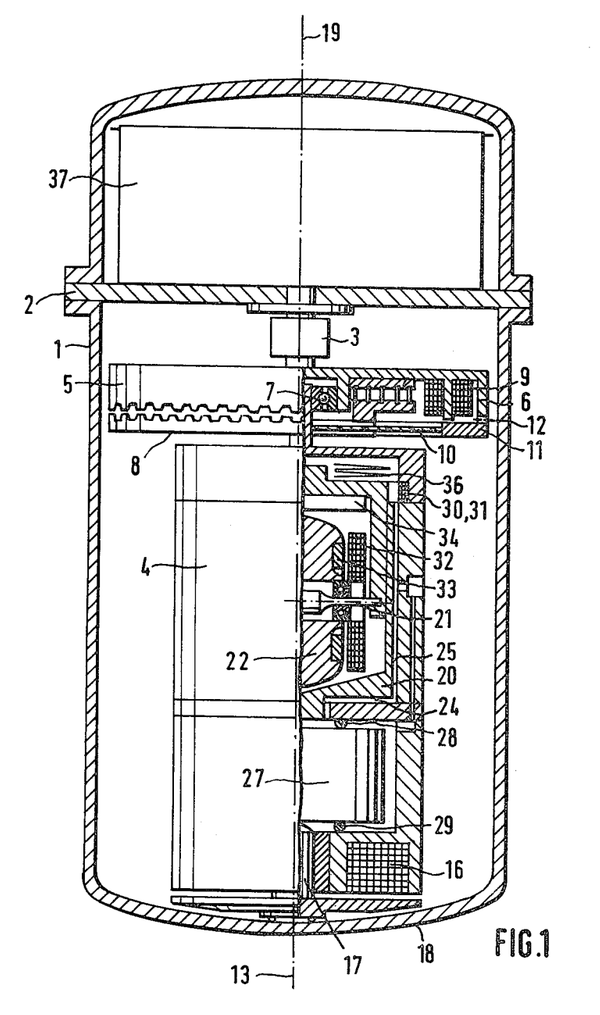
FIG. 1 is an elevational view, partly in cross section, of the structure of a preferred embodiment of a gyrocompass according to the invention.

The gyrocompass illustrated in FIG. 1 includes, in a housing 1, a pendulous body 4 suspended from a base platform 2 via a cardan, or universal, joint 3. Between the schematically illustrated joint 3 and the pendulous body 4 there is disposed a stepping motor 5 in the form of a wobble plate motor. The principles of such a motor are known for example from U.S. Pat. Nos. 3,492,515, 3,579,276 or 3,585,426.

The stepping motor includes a stator 6 which is fastened to the joint 3 and a rotor 8 which is rotatably mounted in a ball bearing 7. The ball bearing 7 simultaneously serves to provide a support bearing for the pendulous body 4, which is connected with the rotor 8. On the stator 6, distributed around the circumference thereof, there are disposed a plurality of electrical windings 9.

The rotor includes a ring of teeth 11, the teeth of which are spaced apart about the circumference of the rotor. Ring 11 is connected with the pendulous body by means of an axially yielding and radially stiff plate or by means of a diaphram 10. A ring of teeth 12, the teeth of which are also spaced apart about the rotor circumference, is disposed on the stator opposite the ring of teeth 11 to cooperate with the latter ring. The rings of teeth 11, 12 each have a large number of teeth, the difference between their numbers of teeth preferably being equal to one. Via slip-rings 14 provided between rotor and stator of the stepping motor the supply current for the several component of the pendulous body 4 and for the signals of the gyroscope are transmitted.

In such a stepping motor the width of the steps can be roughly selected according to the numbers of teeth and number of windings 9, a very high pitch accuracy being nevertheless possible. Thus the pendulous body 4 can be fully turned through the entire angular range and can be set with high accuracy. The stepping motor 5 simultaneously serves as the sensor for the angular position of the pendulous body 4 with respect to the housing 1, for which purpose, starting from a given zero position, it need only count out the control signals for the windings 9. A simple zero position pickup (not shown here) is provided for that purpose.

At the lower end of the pendulous body 4 there is provided an electrically actuated verticality magnet 16 having an armature 17 which is designed as a so-called "tramping foot" and is supported on a calotte, or bowl-shaped portion 18 of the housing 1. It can be seen that thus a verticality device is provided for the cardanically suspended pendulous body 4.

If, for example, unlike the orientations shown in FIG. 1, the axis 13 of body 4 is not oriented vertically, a pulsed actuation of the verticality magnet 16 can lift the armature 17 off the calotte to permit the pendulous body 4 to align itself exactly vertically. For this verticality adjustment, which takes only a very short time of about five seconds, it is advisable to select the actuation frequency for the verticality magnet 16 to be about four times as high as the natural pendulum frequency of body 4. If necessary, the verticality adjustment can also be effected by means of verticality sensors and setting members controlled thereby, such as, for example, servomotors or torquers. This is known in the gyroscopic technnique.

Within the pendulous body 4 there is disposed a precession gimbal 20 which supports a gyro rotor 22 that is rotatable about a spin axis 21. The gimbal 20 is mounted to be rotatable with respect to the pendulous body 4 or a follow-up gimbal, respectively, about the output axis or axis of rotation 13, respectively, of body 4 by means of a static gas bearing defined by axial and annular, radial air gaps 24 and 25. A compressor 27, shown schematically, is provided in the lower part of the pendulous body 4 to supply gas under pressure to the bearing. The compressor 27 is supported in the pendulous body 4 by means of annular vibration damping elements 28 and 29 which could, for example, be elastic O-rings. There also is provided an angular position sensor and a torquer 30, 31. These allow the angular position of the gimbal 20 or of the spin axis 22 with respect to the pendulous body 4 to be monitored, on the one hand and, on the other hand, a restraining moment about the axis of rotation 13 can be generated to restrain the gimbal 20 in a given zero position.

A motor, preferably a brushless d.c. motor, composed of a stator 32 fixed to gimbal 20 and a rotor 33 fixed to rotor 22 is provided for driving rotor 22. At each one of its two longitudinal ends, stator 32 is provided with a multiphase stator winding which is connected to the gimbal 20, and on the two ends of gyro rotor 22 opposite thereto the rotor 33 is composed of permanent magnets which are polarized alternatingly in the direction of the spin axis 21. The necessary commutation electronics 34, which can be electrically of conventional design, are disposed in the gimbal 20 above the gyro rotor 22. Additionallly, there are provided current supply springs 36, which are schematically illustrated between pendulous body 4 and gimbal 20, for supplying operating current to circuitry 34, motor 32, 33. Complete electronic circuitry 37, including a computer or microprocessor and current supply, required to effect the north seeking process, is accommodated in the upper portion of the gyro on the base plate 2, or may also be accommodated in a separate housing.

Figure 2:
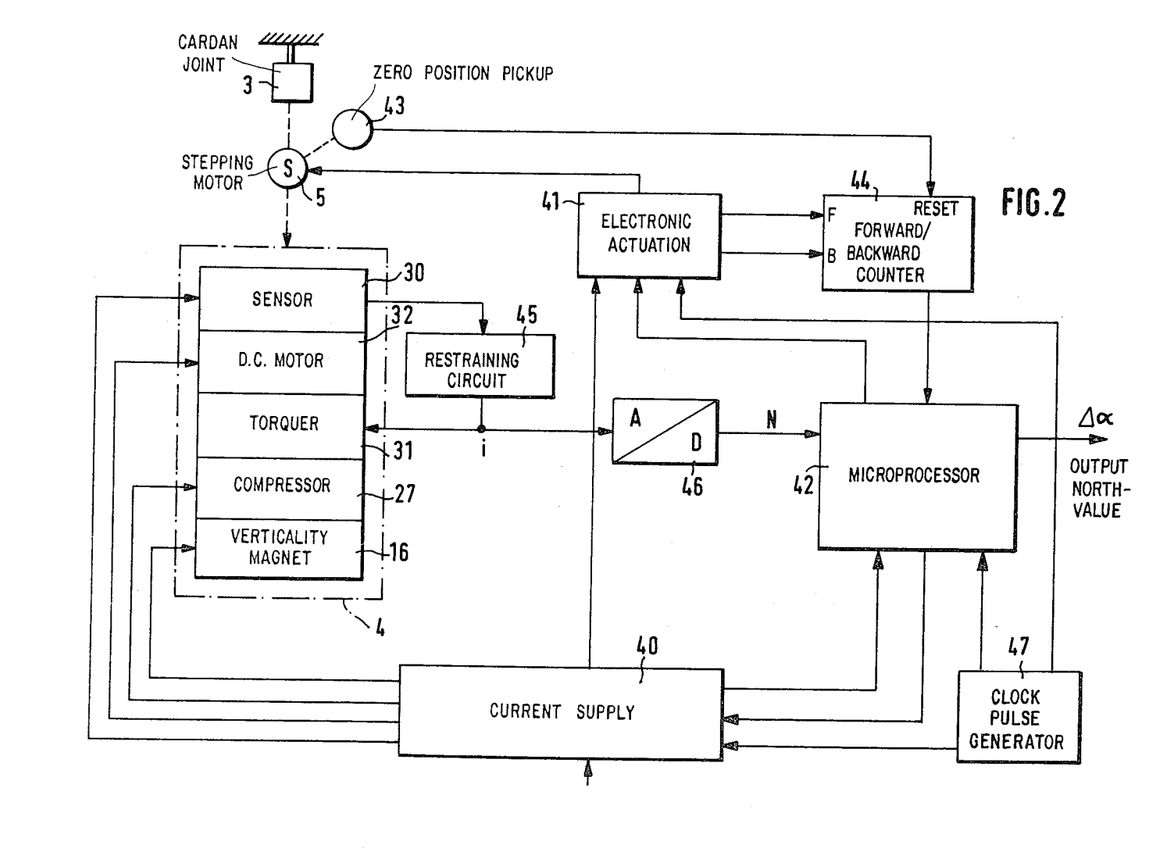
FIG. 2 is a block circuit diagram of a suitable embodiment of circuitry for the gyro according to FIG. 1.

The basic configuration of the electronic system for the gyro will be explained in connection with the block circuit diagram of FIG. 2, the same reference numerals being employed for the components already described above. There is provided a current supply 40 for the verticality magnet 16, compressor 27, d.c. motor 32, and sensor 30, as well as for an electronic actuation system 41, including electronics 34, for the stepping motor 5 and for a computer or microprocessor 42. In addition to controlling the north seeking process and calculating the angular values, the microprocessor 42 also serves to filter out the influences of interfering movements to be described in detail below which occur, for example, in the form of vibrations acting on the housing. It can be seen that, if necessary, a conventional calculating and control unit can also be used.

The stepping motor 5 additionally is associated with a simple zero position pickup, or sensor, 43 arranged to provide an indication when body 4 is in a defined zero angular position. The zero position pickup is connected to the reset input of a forward/backward counter 44 whose forward and backward inputs F and B receive signals corresponding to the number of steps as well as the direction of rotation of motor 5 from the electronic actuation system 41. Under consideration of the width of each step of stepping motor, the counter state of counter 44 thus corresponds to the angular position of the pendulous body relative to housing 1.

The gimbal 20 is restrained, in a defined zero position with respect to the pendulous body 4 or to the follow-up gimbal, respectively, by means of a restraining circuit 45. In the stationary state, the current to the torquer 31 is then a measure for the restraining moment required to compensate the north driving moment and also to compensate interfering moments. A signal proportional to that current is advisably supplied to the microprocessor 42 via an analog/digital converter 46. Clock pulses for the microprocessor 42 and the other parts of the electronic system are furnished by, for example, a quartz stabilized clock pulse generator 47.

The technique of zero positioning by means of a restraining circuit is known i.e. from U.S. Pat. No. 2,669,126.

The sequence of operations in a north seeking process as well as the control and calculating steps performed in connection therewith will now be described. The gyro is switched on by means of an externally generated north seeking instruction. To align the pendulous body 4 in the vertical direction, the verticality magnet 16 is excited with signals at four times the natural pendulum frequency of body 4 and after a few seconds the output axis or axis of rotation 13 will become aligned precisely in the vertical direction. Now the gyro rotor 21 is set in motion and runs up to its desired rate of rotation, and at the same time the stepping motor 5 is turned quickly so that the counter 44 is erased upon passing over the preselected zero position and thereafter the counter state will correspond to the angular position of the pendulous body. It is advisable to close the restraining circuit already during the start-up period.

As soon as the gyro rotor 22 has reached its desired rate of rotation, the first rough measurement of the restraining moment $M_1$, proportional to current i, or of the input angular velocity $\omega_1$, of gimbal 20 about axis 19 respectively, is made in the first position of the gyro, under consideration of the angular momentum H of the gyro according to the relationship $M_1 = \omega_1 \cdot H$. The restraining moment M exerted by the torquer is proportional to the current i which again results in a numerical value N proportional to M at the output of the A/D converter. The value N is therefore proportional to the input angular velocity $\omega$. The value $K = \omega/N$ is the total gain of the gyro. It is approximately constant; however, slight changes resulting, for example, from changes in temperature or aging of components can be detected automatically and taken into consideration by a calibration process which will be described below.

The following relationship applies for $\omega_1$:

$$\omega_1 = \Omega_H \cdot \sin \alpha_o + D + \delta \omega_1 \qquad (1)$$

where $\Omega_H = \Omega \cdot \cos \phi$ is the horizontal component of the rotation of the earth at a geographic latitude $\phi$ 106 is the valicity of the earth expressed in degree of angle per hour $\alpha_o$ is the existing azimuth angle between the axis 21 and geographic north D is the gyro drift $\delta\omega_1$ is the measuring error due to internal and external interfering values.

Body 4 is now rotated by means of the stepping motor 5 about a defined angle of, in particular, 90° and a second rough measurement is taken. This yields:

$$\omega_2 = \Omega_H \cdot \sin(\alpha_o + 90°) + D + \delta\omega_2 \qquad (2)$$

During these rough measurements, the measured values of current i fed to the microprocessor 42 via the analog/digital converter 46 are read out regularly over a period of time of several seconds each and an average is formed of each of these individual measured values of $\omega_1$ and $\omega_2$, respectively. If the individual measured values contain a great deal of interference particularly due to external interfering movements, it is advisable to extend the measuring periods.

If the stepping motor can be rotated through an angle greater than 360°, the second rough measurement can be performed after rotation in a positive or negative sense, but care must be taken that the algebraic sign of the rotation is noted.

If the angular range is exactly 360°, it is advisable to perform the two rough measurements in such a way that the second rough measurement lies at least approximately in the middle of the range of rotation.

Now a first rough estimated value $\tilde{\alpha}_0$ for the azimuth angle is determined with the measuring errors $\delta\omega_1$ and $\delta\omega_2$ being neglected and the sign, or sense, of rotation, respectively, being considered. This determination is made according to the relationship $$\tilde{\alpha}_o = \arctan \frac{\omega_1 + D^*}{\omega_2 - D^*} \qquad (3)$$

where $D^*$ is an estimated value for the gyro drift. This estimated value of D is zero during the first north seeking process and is iteratively improved during further north seeking processes as will be described below. If the north seeking process has to be interrupted at this point in time, there is available at least a rough approximation $\tilde{\alpha}_0$ of the azimuth angle.

Controlled by the microprocessor 42, the electronic actuating mechanism 41 then rotates the stepping motor 5, or the pendulous body 4, respectively, through the angle $\tilde{\alpha}_0 \pm 90°$, the angular component $\pm 90°$ being included to take into account the rotation by 90° prior to the second rough measurement so that the spin axis 21 is oriented roughly in the north direction. According to an advantageous embodiment, this rotation always takes place over the shortest path, either toward north or toward south, depending on which position is closer. It should be pointed out here that the rough alignment of the gyro can also be effected in some other way if required, for example by means of another north reference.

Once the rough alignment has been accomplished, a first fine measurement of the angular velocity takes place and the following relationship applies:

$$\omega_3 = \Omega_H \cdot \Delta\alpha + D + \delta\omega_3 \qquad (4)$$

Here, $\Delta\alpha$ is the deviation from north due to the inaccuracy of the calculation of $\tilde{\alpha}_0$ and due to the finite length of the steps of the stepping motor, based on the approximation that for small angles the sine corresponds to the angle value and $\delta\omega_3$ is the measuring error. In the interest of optimum interference suppression, individual measured values are again read out and averaged by means of the microprocessor over a longer period of time, namely over a period of approximately 1 minute. These individual values are advisably smoothed in the microprocessor 42 by means of lowpass filters, with the time constant increasing continuously. Additionally, it is very advisable to leave out of consideration individual measured values whose difference from the filtered average of the preceding values exceeds a preselected tolerance threshold. This tolerance threshold preferably decreases over the measuring period. It is additionally recommended to determine the tolerance threshold for each individual measured value or for a group of individual measured values from the spread of the preceding individual measurements and/or to shorten or extend the measuring period in dependence on this spread.

Thus, higher frequency interference components are filtered out of the individual measured values and additionally those individual measured values are suppressed which deviate greatly from the average, with the result that one-time interferences in particular are effectively suppressed. On the other hand, the north seeking process can already be interrupted, if necessary, after the first fine measurement and the north direction can be determined from the average angular velocity $\bar{\omega}_3$ obtained thus far, although with lesser accuracy.

The microprocessor determines the remaining mechanical north deviation $\Delta\alpha^*$ from the thus obtained average $\bar{\omega}_3$ of the angular velocity $\omega_3$:

$$\Delta\alpha^* = \frac{\bar{\omega}_3 - D^*}{\Omega_H} \qquad (5)$$

The north direction is determined from the north deviation $\Delta\alpha^*$ together with the signal from the stepping motor which corresponds to the angular position $\alpha_0$.

This produces the error:

$$\delta\alpha_3 = \Delta\alpha - \Delta\alpha^* = \frac{D^* - D - \delta\omega_3}{\Omega_H} \qquad (6)$$

Due to the above-described filtering and average formation, the measuring error $\delta\omega_3$ during the first fine measurement is relatively small. Since, however, the actual gyro drift D generally differs from the estimated value $D^*$ considered thus far due to changes in temperature, aging etc., a preferred feature of the invention substantially suppresses the systematic error component $\Delta D = D^* - D$ by a subsequent calibration. For this purpose, the stepping motor 5 rotates the gyro through 180° as accurately as possible. In this position a second fine measurement is made of the angular velocity $\omega_4$ and again the above-described average formation and filtering takes place for the individual measured values, yielding:

$$\omega_4 = -\Omega_H \cdot \Delta\alpha + D + \delta\omega_4 \qquad (4)$$

From the thus determined angular velocities of the two fine measurements, the north deviation $\Delta\alpha$ is now determined under the prerequisite that the measuring errors $\delta\omega_3$ and $\delta\omega_4$ are substantially less than the error component $\Delta D$, so that the following relationship applies:

$$\Delta \alpha = \frac{\omega_3 - \omega_4}{2 \Omega_H} \quad (8)$$

The north direction or the north angle $\alpha$, respectively, is now determined from the north deviation $\Delta \alpha$ as well as from the angular position of the pendulous body, and this with very high accuracy. In other words: the time-constant error component as a result of the interfering moment is calculated from the measured values of the two fine measurements and is compensated in the calculations.

Furthermore, the gyro drift $\overline{D}$ is determined, at least in approximation, from the relationships (4) and (7), i.e. from the filtered measured values $\omega_3$ and $\omega_4$ according to the following relationship:

$$\overline{D} = \frac{\omega_3 + \omega_4}{2} \quad (9)$$

The thus obtained average is stored in the microprocessor 42 as a new estimated value $D^*$. During the next north seeking process, the north deviation is determined with this estimated value after the first fine measurement according to equation (5).

This makes it possible, particularly for the case where there is insufficient time for a second fine measurement, to have a quite accurate determination of the north deviation according to equation (5) already after the first fine measurement.

For solving the above relationships (5) and (8), knowledge of the horizontal component of the earth's rotation $$\Omega_H = \Omega \cdot \cos \overline{\phi}$$

is required. It is known that for small deviations from north, it is sufficient to calculate with an average value that is accurate up to a few percent and is applicable for the respective geographic area, and this is fed from an external source into the computer or microprocessor. According to a preferred embodiment of the invention it is proposed, however, to calculate the horizontal component $\Omega H$ to an approximation, from the measured values $\omega_1, \omega_2$ obtained in the two rough measurements, according to the relationship:

$$\widetilde{\Omega}_H = \sqrt{(\omega_1 - D^*)^2 + (\omega_2 - D^*)^2} \quad (10)$$

Advisably the value for gyro drift obtained according to equation (9) is here taken into consideration. Additionally, the thus calculated horizontal component of the earth's rotation, $\Omega_H$, is used to determine an approximate value for the geographic latitude according to the equation:

$$\widetilde{\phi} = \arccos \widetilde{\Omega}_H/\Omega \quad (11)$$

Since, in the above-described measurements, the angular velocities $\omega$ are not available directly as output values, but only the resulting digital values N, the total gain K of the calculating system must be known. For this purpose, the spin axis is rotated from time to time into each of two positions which are shifted preferably by $\pm 90°$ with respect to north after the rough measurement and before the fine measurement. This produces the following measured values:

$$N_5 = \frac{1}{K}(\Omega_H \sin(\Delta \alpha + 90°) + D + \delta \omega_5) \quad (12)$$

$$N_6 = \frac{1}{K}(\Omega_H \sin(\Delta \alpha - 90°) + D + \delta \omega_6)$$

These values can be used to calculate the approximate gain according to the equation $$K = \frac{2 \Omega_H}{N_5 - N_6} \quad (13)$$

since
sin $(\Delta \alpha + 90°) = \cos \Delta \alpha \approx 1$, and
sin $(\Delta \alpha - 90°) = -\cos \Delta \alpha \approx -1$.

The gyro is oriented in the north direction by the abovedescribed process steps, the stepping motor 5 being used to place the pendulous body 4, and thus also the restrained gyro spin axis 21, into the respectively required position with great accuracy. Here, the microprocessor 42 preferably serves to control the individual process steps as well as to calculate the given angle values and to filter the individual measured values obtained from rough and fine measurements of restraining moment or angular velocity, respectively.

It will be appreciated that element 42 can be constituted by a relatively simple general purpose device and that the programming for solving the mathematically simple equations set forth above can be developed in a straightforward manner based on principles and techniques now well known in the art.

As said above the controls of the components of the gyrocompass and the calculations of the different values can be performed by a micro-processor, for example by the Micro-Processor MC 6809 of the US-Company Motorola Semiconductor Inc.

Figure 3:
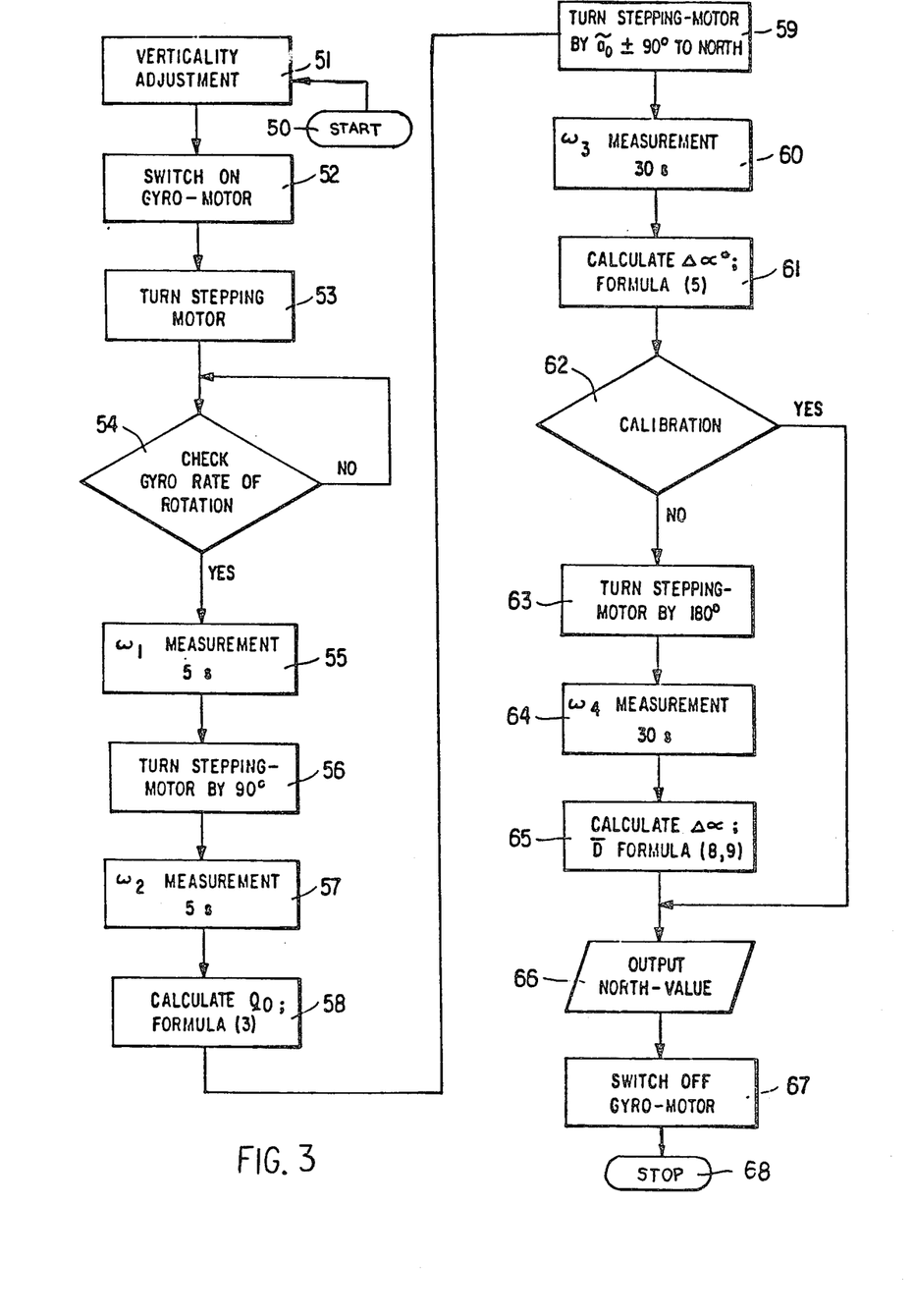
FIG. 3 is a flow-diagram for a micro-processor for performing the north finding method according to the invention.

In FIG. 3 the flow diagram for the most important controls and measurements is shown.

After the start (block 50) is initiated at first the pendulous body is vertically adjusted (51); thereafter the gyro-motor is switched on (52). While it runs up to the desired rate of rotation the stepping motor is turned (53) to pass through its zero position; this is necessary to know during the program the angular position of the pendulous body. As soon as the gyro has reached its predetermined rate of rotation (54) the measurement of $\omega_1$ can be initiated (55) which measurement may have a duration of 5 sec. Thereafter the stepping-motor is turned by 90° (56) and then the measurement of $\omega_2$ is initiated (57) which lasts also 5 sec.

With the $\omega_1$- and $\omega_2$-values measured a rough estimated value for the azimuth angle is calculated according to formula (3) (58). Then the stepping motor is turned by $\widetilde{\alpha}_0 \pm 90°$ to north (59).

In this position of the pendulous body a first fine measurement ($\omega_3$) is performed during 30 sec. (60). With this $\omega_3$-value the north deviation $\Delta \alpha^*$ is calculated according to formula (5) (61). If no further improvement of the north value is desired (62) the north value improved by $\Delta \alpha^*$ may be indicated (66).

If a more improved north value and/or a correction of the estimated gyro drift $D^*$ is desired the stepping motor may be turned by 180° (63) and in this position a $\omega_4$-measurement is performed (64). By means of the measured $\omega_3$- and $\omega_4$-values a more improved north deviation Δα and/or a improved gyro-drift $\overline{D}$ may be calculated (65) according to formulas (8) and (9). These calues may be indicated and/or stored (66). Thereafter the gyro-motor is switched off (67) and the program is stepped (68). It will be understood that the above description of the present invention is susceptible to various modifications, changes and adaptations, and the same are intended to be comprehended within the meaning and range of equivalents of the appended claims.

What is claimed is:

1. In a gyrocompass including a first gimbal, a gyro motor mounted in the first gimbal and including a gyro rotor mounted to rotate about a horizontally alignable spin axis, a body in which the first gimbal is mounted to be rotatable about a vertically alignable axis of rotation, a housing in which the body is rotatably suspended, a verticality device associated with the body for allowing the body to assume an orientation in the housing in which the axis of rotation is vertical, and a follow-up device including a pickup mounted for sensing the angular position, about the axis of rotation, of the gimbal relative to the body and a drive connected for rotating the body relative to the housing about the axis of rotation in dependence on the position sensed by the pickup, the improvement wherein said drive comprises a stepping motor constructed to rotate in highly uniform steps and simultaneously serving to provide an indication of the angular position of said body relative to said housing about said axis of rotation.

2. Gyrocompass as defined in claim 1 further comprising a cardan joint suspending said body in said housing.

3. Gyrocompass as defined in claim 2 wherein said cardan joint is firmly connected to said housing and said stepping motor is diposed between said cardan joint and said body.

4. Gyrocompass as defined in claim 2 or 3 wherein said stepping motor is a flat plate motor having a stator connected to said cardan joint, a rotor connected to said body, and a bearing rotatably supporting both said rotor and said body.

5. Gyrocompass as defined in 1, 2 or 3 claim wherein said stepping motor is provided with meshing rings of teeth on said stator and said rotor, each ring being composed of a large number of teeth, with the teeth on one ring differing from those on the other ring by at least one, and the ring of teeth of said rotor being arranged to be yielding in the direction of the axis of rotation and to be stiff in the circumferential direction of said motor.

6. Gyrocompass as defined in claim 1, 2 or 3 wherein said verticality device comprises an electrically actuatable electromagnet which is disposed at the lower end of said body being pendulous body and having an armature and said housing has a calotte-shaped part with which said armature is in contact temporary.

7. In a gyrocompass including a first gimbal, a gyro motor mounted in the first gimbal and including a gyro rotor mounted to rotate about a horizontally alignable spin axis, a body in which the first gimbal is mounted to be rotatable about a vertically alignable axis of rotation, a housing in which the body is rotatably suspended, a verticality device associated with the body for allowing the body to assume an orientation in the housing in which the axis of rotation is vertical, a follow-up device including a pickup mounted for sensing the angular position, about the axis of rotation, of the gimbal relative to the body, and a drive connected for rotating the body relative to the housing about the axis of rotation in dependence on the position sensed by the pickup, the improvement wherein: said drive comprises a stepping motor for rotating the body with highly uniform steps in defined positions; said follow-up device further comprises a restraining circuit and a torquer connected between said pickup and said first gimbal for restraining said first gimbal at a defined angular position, about the axis of rotation, relative to said body, said restraining circuit providing a signal representative of the angular velocity of said first gimbal about the axis of rotation; and said gyrocompass further comprises means for determining the direction to true north from signals representative of said angular velocity.

8. Gyrocompass as defined in claim 7 wherein said determining means comprise a data processor connected to receive signals representative of said angular velocity and of the angular position of said body about the axis of rotation, and to provide an indication of the north direction from such signals.

9. Gyrocompass as defined in claim 7 or 8 wherein the length of each step rotation imposed on said body by said stepping motor is relatively large, while the reproduceable setting accuracy is of the order of magnitude of the desired measuring accuracy of said gyrocompass.

10. Gyrocompass as defined in claim 7 wherein said follow-up device comprises an electronic actuating system connected for supplying drive signals to said stepping motor and a zero position pickup connected for providing an indication when said motor is at a predetermined zero angular position, the actual angular position of said motor being determined from the signals from said electronic actuating system and from said zero position pickup.

11. Method for operating a gyrocompass which is composed of a first gimbal, a gyro motor mounted in the first gimbal and including a gyro rotor mounted to rotate about a horizontally alignable spin axis, a body in which the first gimbal is mounted to be rotatable about a vertically alignable axis of rotation, a housing in which the body is rotatably suspended, a verticality device associated with the body for allowing the body to assume an orientation in the housing in which the axis of rotation is vertical, a follow-up device including a pickup mounted for sensing the angular position, about the axis of rotation, of the first gimbal relative to the body, and a drive connected for rotating the body relative to the housing about the axis of rotation in dependence on the position sensed by the pickup, and in which said drive comprises a stepping motor for rotating said body with highly uniform steps in defined positions, said follow-up device further includes a restraining circuit and a torquer connected between said pickup and said first gimbal for restraining said first gimbal at a defined angular position, about the axis of rotation, relative to said body, said restraining circuit providing a signal representative of the angular velocity of said first gimbal about the axis of rotation, and said gyrocompass further includes means for determining the direction to true north from signals representative of said angular velocity, said method comprising: rotating said body, by means of said stepping motor, about the axis of rotation, to at least two successive, mutually spaced, arbitrary angular positions; effecting first measurements of the angular velocity of said first gimbal about the axis of rotation at each of the angular positions; deriving from the angular velocity measurements a first estimated value for the azimuth angle between the spin axis and north for one of the arbitrary angular positions; and thereafter rotating said gyro motor by means of said stepping motor about the axis of rotation through an angle dependent of the estimated azimuth angle value in such a manner as to achieve a rough alignment of the spin axis with the north direction.

12. Method as defined in claim 11 wherein said step of rotating is carried out to rotate said body between two angular positions which are about 90° apart and said step of deriving the first estimated value is carried out by determining the value of $$\arctan \frac{\omega_1 - D^*}{\omega_2 - D^*}$$

where $\omega_1$ and $\omega_2$ are the angular velocity values measured at the two angular positions, respectively, and $D^*$ is representative of the value of gyro drift.

13. Method as defined in claim 11 or 12 wherein the stepping motor can be rotated over a finite angular range of equal to or greater than 360° and said step of rotating is carried out to cause the second angular position to be at least approximately in the area of the middle of the angular range.

14. Method as defined in claim 11 or 12 wherein said first measurement at each angular position is made over a preselected period of time of a few seconds, and is obtained by deriving a number of individual measured values at regular intervals and deriving each angular velocity value by filtering and/or average formation of the associated individual measured values.

15. Method as defined in claim 12 further comprising deriving an approximate value for the horizontal component of the earth's rotation by determining the value of $$\sqrt{(\omega_1 - D^*)^2 + (\omega_2 - D^*)^2}.$$

16. Method as defined in claim 11 further comprising, after said step of rotating said gyro motor to achieve a rough alignment, restraining the spin axis in this position by means of said restraining circuit; effecting a first fine measurement of the angular velocity of said first gimbal; and making a first determination of the north deviation of said spin axis by determining the value of $$\frac{\omega_3 - D^*}{\Omega_H},$$

where $\omega_3$ is the angular velocity value obtained by said first fine measurement, $D^*$ is representative of gyro drift, and $\Omega_H$ is an at least approximate value for the horizontal component of the earth's rotation.

17. Method as defined in claim 16 wherein said first fine measurement is made over a preselected period of time and is obtained by deriving a number of individual measured values at regular intervals and deriving the associated angular velocity value by filtering and/or average formation of the individual measured values.

18. Method as defined in claim 17 wherein said step of deriving the associated angular velocity values is carried out by smoothing the individual measured values in a lowpass filter.

19. Method as defined in claim 18 further comprising increasing the time constant of the lowpass filter during the preselected period of time.

20. Method as defined in claim 17, 18 or 19 wherein said step of deriving the associated angular velocity value is carried out by disregarding each individual measured value which differs from the filtered average of all preceding measured values by more than a predetermined amount.

21. Method as defined in claim 20 wherein said step of deriving the associated angular velocity value comprises reducing the magnitude of the predetermined amount during the preselected period of time.

22. Method as defined in claim 20 wherein said step of deriving the associated angular velocity value comprises determining the magnitude of the predetermined amount for at least one measured value as a function of the range covered by the preceding individual values.

23. Method as defined in claim 20 wherein said step of deriving the associated angular velocity value comprises varying the duration of the preselected period of time as a function of the range covered by the preceding measured values.

24. Method as defined in claim 16 further comprising, after said step of determining the north deviation: rotating said body by means of said stepping motor, about the axis of rotation through a predetermined angle; effecting a second fine measurement of the angular velocity of said first gimbal; and determining constant components of interfering moments in the measured values from the first and second fine measurements.

25. Method as defined in claim 24 wherein the predetermined angle is 180°.

26. Gyrocompass as defined in claim 24 wherein said second fine measurement is made over a preselected period of time and is obtained by deriving a number of individual measured values at regular intervals and deriving the associated angular velocity value by filtering and/or average formation of the individual measured values.

27. Method as defined in claim 24, 25 or 26 further comprising, after said step of effecting a second fine measurement, making a second determination of the north deviation of said spin axis by determining the value of $$\frac{\omega_3 - \omega_4}{2 \cdot \Omega_H},$$

where $\omega_4$ is the angular velocity value obtained by said second fine measurement.

28. Method as defined in claim 24, 25 or 26 further comprising after said step of effecting a second fine measurement: determining the value of gyro drift by determining the value of $(\omega_3 + \omega_4)/2$, where $\omega_4$ is the angular velocity value obtained by said second fine measurement; and using the determined gyro drift value in subsequent determinations which take account of gyro drift.

29. Method as defined in claim 11 further comprising, after said step of deriving: rotating said first gimbal about the axis of rotation to at least an angular position which is offset from north by a selected angle; and effecting a further measurement of the angular velocity of said first gimbal about the axis of rotation, and wherein each said step of effecting measurement is carried out by generating, in an A/D converter, a digital value representative of an associated angular velocity value, and additionally comprising using the digital value associated with the further measurement to determine the incremental change in digital values.

30. Method as defined in claim 29 wherein each said step of effecting measurement is carried out in a circuit which includes the A/D converter and which has a total gain represented by the ratio of each angular velocity value to its associated digital value, and further comprising determining the value of the total gain by determining the ratio of the difference between two measured angular velocity values and the difference between the two corresponding digital values.

31. A method as defined in claim 11 or 12 further comprising, after said step of making a first determination: rotating said body about the axis of rotation, to two successive further angular positions corresponding exactly to the estimated value plus and minus 90°, respectively; effecting measurement of the angular velocity of said first gimbal at each further angular position by generating a digital value representative of each angular velocity value, in a circuit which includes an A/D converter and which has a total gain represented by the ratio of each angular velocity value to its associated digital value; and determining the value of such total gain by determining the value of the ratio of two times the horizontal component of the earth's rotation to the difference between the digital values generated for each further angular position.

32. Method as defined in claim 11 wherein said steps of deriving and rotating are performed by the operation of a microprocessor.

* * * * *